3,394,200
METHOD FOR REMOVING OLEFINS AND CORROSION BODIES FROM ORGANIC COMPOUNDS

Herbert Sargent, Garden Grove, Calif., assignor to Atlantic Richfield Company, Philadelphia, Pa., a corporation of Pennsylvania
No Drawing. Filed Feb. 18, 1966, Ser. No. 528,416
9 Claims. (Cl. 260—676)

ABSTRACT OF THE DISCLOSURE

This application describes a method for removing olefins and nitrogen and sulfur contaminants from organic materials such as hexane, by treating the organic materials with ozone to oxidize the olefins and other contaminants, and subsequently passing the organic materials with the oxygenated materials, through an adsorptive filter to remove the oxygenated materials.

---

This invention is concerned with a method for purifying organic compounds and more particularly with a method for removing olefins and other corrosion bodies from saturated and aromatic organic compounds by contacting the olefin and corrosion body containing compounds with an ozone containing gas to form oxygenated materials and then removing the oxygenated materials by an adsorptive treatment.

One of the most popular methods heretofore used for removing olefins from hydrocarbon fractions has been the treatment of the olefin containing hydrocarbon fractions with strong sulfuric acid. This method has been commonly referred to as acid treating. Although it has been effective in reducing the olefin content of hydrocarbon fractions and has received widespread adoption in industry, it has suffered from a number of disadvantages. Acid treating requires the consumption of large quantities of sulfuric acid and results in the formation of troublesome amounts of acid sludge which present a difficult waste problem. Also, the strong sulfuric acid often causes dimerization of the olefins which are left in unsaturated form in the hydrocarbon phase. This results in a need for a distillation step to remove the dimerized material. Another problem, when sulfuric acid is used, is that sulfur dioxide is produced which also must be removed.

Bromine has also been used as a means to remove olefins from hydrocarbon fractions, but its use has also been accompanied by a number of problems. Molecular olefins tend to initiate a chain reaction with bromine which causes the bromine to add to the saturated hydrocarbon in a substitution-type reaction rather than to the olefin which results in the production of unwanted bromoalkanes. Also, bromine fails to remove all of the olefins contained within a hydrocarbon fraction because of the other reactions which take place. The present invention enables the removal of olefins contained within hydrocarbon fractions without encountering the usual problems such as described above.

This invention provides a simple, low temperature, low pressure non-corrosive process for eliminating olefins and corrosion bodies from aromatic and saturated hydrocarbon streams. It is particularly suitable for the removal of small amounts of olefins, i.e. up to 5% by weight of the matter in which it is contained.

This invention has particular utility in the removal of olefins from saturated hydrocarbons which are to be stored over a considerable period of time. Olefins, if they are not removed, promote oxidation and polymerization which result in the production of gums and other residues which precipitate out and often impair the usefulness of the hydrocarbon material.

It is desirable to remove the nitrogen and sulfur contaminants from saturated hydrocarbons such as hexane when the intended use of the hydrocarbons is as an inert medium for polymerizations such as Ziegler type polymerization. Even trace amounts of sulfur and nitrogen frequently destroy a growing polymer chain and prevent the desired polymerization from occurring.

Briefly, the present invention involves the introduction of ozone, preferably in the form of an ozone containing gas, into a hydrocarbon fraction. The ozone readily reacts with the olefins and corrosion bodies contained within the hydrocarbon fraction to form oxygenated materials. After the ozone treatment, the hydrocarbon fraction containing the oxygenated materials is passed through a filter of an adsorptive material such as activated carbon, clay, silica gel or alumina, which separates the oxygenated materials from the hydrocarbon fraction and permits the recovery of a purified hydrocarbon product.

In a preferred embodiment of the present invention, an oxygen stream containing 1–5% ozone is introduced into a hydrocarbon fraction containing olefins and/or corrosion bodies. The ozone is added until ozone evolves from the hydrocarbon solution indicating that the ozone has reacted completely with all of the olefins and other materials reactable therewith. The evolvement of ozone from the solution can be detected by an indicator such as starch-iodide. After being treated with ozone, the oxygenated bodies formed by reaction of the ozone with the olefins and corrosion bodies are separated by passage of the hydrocarbon fraction with the oxygenated materials through a silica gel or other suitable clay filter. The oxygenated materials are trapped by the clay filter and permit the recovery of the purified hydrocarbon product.

The present invention may be practiced with a variety of olefin containing feedstocks including propylenes, butylenes, pentenes, hexenes, heptenes, octenes, etc. It can be used to remove olefins and corrosion bodies from a large number of organic compounds including saturated hydrocarbons and aromatic compounds such as benzene, alkylbenzene and naphthalene. The amount of ozone contained within the gas used to treat olefin and corrosion body containing hydrocarbons may vary over a wide range, but for safety and handling considerations a gas containing 1–5% is preferred.

The corrosion bodies which are removed using the present process include sulfur contaminants such as sulfides and mercaptans and a number of nitrogen compounds. These corrosion bodies, when brought into contact with ozone, form oxygenated materials which are removed by the clay in the clay filtering step. The removal of the corrosion bodies contained in the hydrocarbons using the present process may be demonstrated by subjecting the hydrocarbon fraction both prior to and after treatment with ozone to a corrosion test such as the copper strip test. A hydrocarbon fraction which shows substantial corrosion when subjected to the copper strip test prior to ozone treatment, shows no corrosion after the ozone and clay filter treatment indicating that the crrosive elements in the hydrocarbon fraction have been removed. The material used as a filter may be activated carbon or may be selected from a number of clay materials which are hydrophilic in nature. The clay acts as an adsorbent which attracts the oxygenated materials to its surface. Thus the ozonides or oxygenated materials which are formed by the ozone treatment are removed during the clay filtering treatment by adsorption on the surface of the clay filter material. Among the clays which may be used in the instant process are silica gel, attapulgite clay, alumina, montmorillonite clay, fuller's clay, and Florida clay.

The following example illustrates in more detail the features of the invention and some of the advantages derived therefrom, but it is to be understood that it is not limitative of the scope of the invention.

Example

A round bottom flask was filled with 800 milliliters of iso-sieve stabilized hexane having a bromine index greater than 50 and a copper strip corrosion test index of 4 indicating that it was heavily corrosive. A fritted tube was placed in the flask and a stream of oxygen containing 3–4% ozone was sparged up through the hexane until ozone could be detected in the gas evolving from the hexane solution. The ozone was detected by wetting starch iodine paper which turns blue when ozone comes in contact with the paper and liberates the iodine which then turns the starch blue. After the positive ozone test was obtained, the gas stream containing ozone was shut off and a vacuum was pulled on the hexane in the flask to remove oxygen which had been dissolved therein. The hexane was then clay treated by passing it at room temperature over silica gel to remove the ozonides and other oxygenated materials which were formed in the ozonation step. The hexane was recovered after filtering and tested for corrosive properties and for olefin content. A copper strip corrosion test was utilized to determine the amount of corrosion and the treated sample of hexane was found to have a corrosion index of 1A indicating no corrosion.

The treated hexane was finally tested with bromine to determine the effectiveness of the process in removing unsaturated materials. The bromine index for the ozone and clay treated hexane was less than 1 indicating almost complete removal of all unsaturated materials in the hexane.

Obviously many modifications and variations of the invention, as hereinbefore set forth, may be made without departing from the spirit of the scope thereof and, therefore, only those limitations should be imposed as are indicated in the appended claims.

I claim:
1. A method for removing olefins and nitrogen and sulfur contaminants contained in organic materials including the steps of: treating said compounds with ozone to form oxygenated materials with said olefins and said contaminants and passing said compounds with said oxygenated materials through an adsorptive filter to remove said oxygenated materials.
2. The method of claim 1 wherein said organic material is selected from the group consisting of saturated organic compounds and aromatic compounds.
3. The method of claim 2 wherein said filter is hydrophilic in nature.
4. The method of claim 2 wherein said compound is a saturated hydrocarbon.
5. The method of claim 4 wherein said saturated hydrocarbon is hexane.
6. The method of claim 2 wherein said filter is selected from the group consisting of activated carbon, silica gel, alumina, attapulgite clay, montmorillonite clay, fuller's clay, and Florida clay.
7. The method of claim 2 wherein said ozone is added in a gas mixture.
8. The method of claim 2 wherein said ozone is added in the form of a mixture of ozone and oxygen.
9. The method of claim 7 wherein said ozone is present in said gas in an amount of from about 1 to about 5 percent.

References Cited

UNITED STATES PATENTS

| | | | |
|---|---|---|---|
| 2,632,778 | 3/1953 | Jonach | 260—676 |
| 3,016,401 | 1/1962 | Sturrock | 260—523 |
| 3,230,271 | 1/1966 | Bole et al. | 260—674 |

DELBERT E. GANTZ, *Primary Examiner.*

J. D. MYERS, *Assistant Examiner.*